May 30, 1967  FRIEDRICH-KARL ARNDT  3,322,210
IMPACT TOOL

Filed Sept. 3, 1964

Inventor:
Friedrich-Karl Arndt

Karl F. Ross
AGENT

United States Patent Office 3,322,210
Patented May 30, 1967

3,322,210
IMPACT TOOL
Friedrich-Karl Arndt, Essen, Germany, assignor to Beteiligungs- und Patentverwaltungsgesellschaft, m.b.H., Essen, Germany, a corporation of Germany
Filed Sept. 3, 1964, Ser. No. 394,290
Claims priority, application Germany, Sept. 6, 1963, B 73,403
9 Claims. (Cl. 173—134)

My present invention relates to impact devices and, more particularly, to percussive tools and appliances, whereby a fluid-responsive piston periodically delivers its kinetic energy to a working implement such as a hammer, drill, chisel, die or the like.

In some earlier devices of this general type, the fluid-responsive piston was reciprocable in a cylinder subdivided into working chambers so that a hydraulic fluid would act differentially upon the piston. To this end, one of the chambers was connected continuously with a source of the medium under pressure while the other chamber alternately communicated between the low-pressure side of the system and the high-pressure line. The piston was so dimensioned that its effective area exposed to the medium in the first chamber was less than that exposed to the medium in the second chamber. To control the flow of medium to and from the second chamber, a slide valve was provided.

Conventional impact devices of this character had, in spite of their ability to deliver kinetic energy of the piston to the working implement when the piston was at its highest speed and thus at the maximum kinetic energy, some not insignificant disadvantages. For one thing, the piston whose energy is transferred to the working implement is accelerated from standstill during its forward stroke to the maximum velocity mentioned above at which its kinetic energy is highest; the quantity, rate of flow and pressure of the medium is thus determined by the accelerated increase in the volume of the piston chamber. During the forward stroke of the piston, therefore, sudden and increasing demands are placed upon the sources of the hydraulic fluid, this source commonly being a pump. Since the delivery rate of a pump cannot be modified, in most instances, without the use of complex control devices, special pumping arrangements or variable-speed pump drives, the increased demand for the medium may result in a decrease in the fluid pressure in the chamber providing the main piston-displacing force. The result can be a deceleration of the piston and, in conventional implement devices, is a decrease in the energy available for transfer to the working implement in all circumstances.

Another disadvantage of conventional systems is that the medium on the low-pressure side of the device, i.e. in the conduits communicating with the reservoir or inlet side of the pump must be accelerated as the piston accelerates while being displaced by the piston. Throttling of the fluid outflow again decreases the kinetic energy available for transfer to the working implement, while the maintenance of passages free from throttling is also disadvantageous; when some form of throttling or fluid control is not available to damp the movement of fluid, as in some conventional devices, the inertia of movement of the accelerated fluid ensures continued movement toward the inlet side of the pump even after the piston has impacted with the implement and ceased its forward movement. Cavitation phenomena are then observed in the region of the piston as a consequence of the continued outflow of medium.

It is the principal object of the present invention to provide a fluid-operated impact device wherein the aforementioned disadvantages can be avoided.

It is a further object of this invention to provide a hydraulically operable percussion appliance having improved medium-control means adapted to deliver peak kinetic energy without the development of cavitation difficulties.

Yet another object of this invention is to provide a device of the character described which is of a relatively simple construction and free from failure while avoiding jarring return strokes of the piston of the device.

These objects and others which will become apparent hereinafter are attained in accordance with the present invention in an impact device which comprises a housing formed with a cylinder bore in which an impacting piston is reciprocable, this piston subdividing the bore into a pair of working chambers in which the piston is formed with differentially effective surfaces; the present improvement includes an annular or ring-shaped slide valve for controlling the fluid flow from one of these chambers from a high-pressure inlet means or line within the housing or from this chamber to a low-pressure line or outlet means, the inlet and outlet means being provided respectively with a high-pressure force-storing accumulator and a low-pressure force-storing accumulator wherein the operating medium can act on force-storing means. The force-storing means of each accumulator, according to the present invention, may be a spring-loaded piston, but preferably is a mass of compressible gas enclosed at least partly by a flexible diaphragm upon which the fluid medium in the high-pressure line and in the low-pressure line can bear within the housing.

According to an important feature of this invention, the annular slide valve coaxially surrounds the piston and preferably also the chamber whose fluid flow is controlled by the slide valve, the annular valve member having an axially extending sleeve portion provided with a pair of axially offset bores adapted to communicate between the interior of this chamber and the high-pressure and low-pressure lines in the two extreme axial positions of the slide valve. The slide valve is provided on its opposite axial extremities with respective pins or plungers forming pistons of different effective cross-sectional areas slidable within respective channels parallel to the axis of the slide member, one of these channels, like the other piston chamber, being continuously connected with the high-pressure line while the other channel is alternately exposed to high pressure or low pressure upon reciprocation of the piston. The pins thus have different effective cross-sections with the pin exposed to the chamber continuously connected to the high-pressure line being the smaller of the two so that the slide valve is displaced under differential action into its position admitting fluid to the piston bore during the return stroke of the impact piston. During the forward or working stroke there, the slide valve is displaced by the continuously acting high pressure and the connection of the larger bore to the low-pressure or outlet line into a position wherein the piston bore communicates with the outlet side.

According to a further feature of this invention, the piston bore is provided with a compartment normally communicating with the atmosphere or another source of gas via a suitable passage whereby this compartment contains a compressible gas, e.g. air. During the return stroke of the piston, however, a shoulder or surface of the latter co-operates with the passage to block it so that further rearward displacement of the piston confines the air within the compartment to form a compressed-air cushion which prevents a jarring impact of the piston on the housing in its extreme withdrawn position.

The above and other objects, features and advantages of the present invention will become more readily apparent from the following description, reference being made to the accompanying drawing in which.

General structural description

Figure 1:
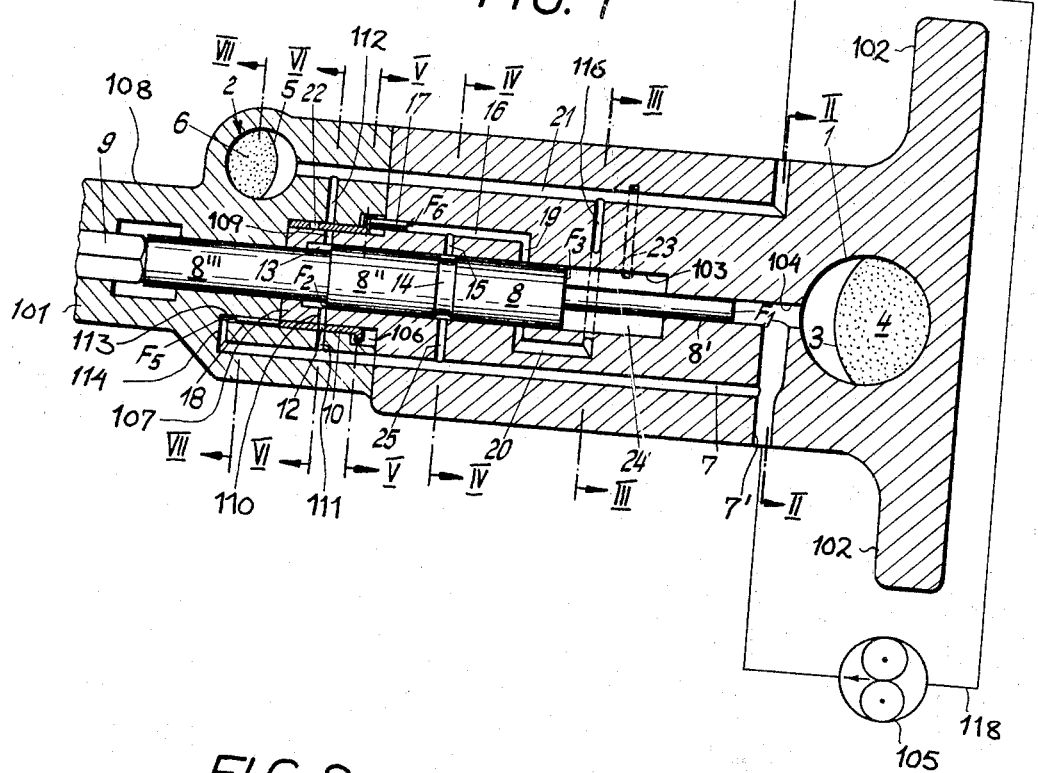
FIG. 1 is an axial cross-sectional view of an impact device according to the present invention.
Figure 2:
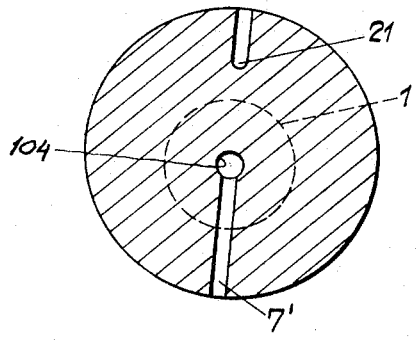
FIG. 2 is a cross-sectional view taken along the line II—II of FIG. 1 showing the high-pressure and low-pressure lines as well as the piston bore.

In FIG. 1, I show a housing 100 of the impact device of a percussion tool which may be used in conjunction with any conventional impacting working implement. The housing 100 has a working extremity 101 adapted to receive the chipping hammer 9 or any other tool bit or implement. Housing 100 is provided with a pair of handles 102 and is formed with an axially extending bore generally designated 103, axially aligned with the implement 9. The high pressure inlet means includes a line 7, extending axially parallel to the bore 103, has a radial inlet passage 7′ by means of which it is connected with a narrow extension 104 of the bore 103 and with a source of hydraulic fluid schematically represented by the pump 105. A piston 8 is reciprocable in the bore 103 and has a rod-like shank 8′ extending into the narrow bore 104 and providing therein a piston surface $F_1$ which is constantly exposed to the high pressure of inlet 7′ and high-pressure line 7. This shank 8′ extends rearwardly from the body 8″ of the piston 8 which, at its junction with shank 8′, is formed with a piston surface $F_3$ (i.e. a transverse shoulder) exposed within a compression compartment 24 of bore 103; the function of this compression compartment will be described in greater detail hereinafter. A further portion 8‴ of the piston 8, whose diameter is intermediate that of the body 8″ and the shank 8′, extends from the forward end of the body 8″ and joins the latter in a shoulder whose effective piston surface $F_2$ is exposed to fluid within working chamber 13, the other working chamber of the piston being formed by the bore portion 104.

A passage 25 leads from the high-pressure line 7 to the cylinder bore 103 into which it opens diametrically opposite a radial passage 15 communicating with a bore 16 within which a pin 17 is reciprocable parallel to the axis of piston 8. The pin 17 has a relatively large diameter and is affixed to an annular, sleeve-like slide valve 10 which is shiftable in an annular compartment 106 in axial direction; the sleeve-like slide valve 10 coaxially surrounds the working chamber 13 and the piston 8. Chamber 13 can be defined by a bushing 107 received within the end 108 of the housing 100 and held in place against a projection of the rear portion. Alternatively, part 107 can be integral with the right-hand side of the housing as illustrated in FIG. 1 and can be provided with a pair of radial bores 109, 110, on diametrically opposite sides of chamber 13. The slide valve 10 is provided with a pair of axially offset apertures 12 and 22, on diametrically opposite sides of the slide, which are alignable with the bores 110 and 109, respectively, in the extreme left-hand and right-hand positions of this slide. When registering with the bores 110 and 109, the apertures 12 and 22, respectively, communicate between the high-pressure line 7 and the working chamber 13 and this chamber and a low-pressure outlet means including line 21 running axially through the housing. To this end, the high-pressure line is provided with a branch passage 111 while the low-pressure line 21 has a branch passage 112. The slide valve 10 is provided at its forward axial end with a small diameter pin 18 which is reciprocable within a bore 113 parallel to the axis of piston 8, this bore communicating with the high-pressure line 7 via a passage 114. Pins 17 and 18 are thus disposed on diametrically opposite sides of the slide valve 10 and opposite axial extremities thereof and constitute differential-piston means for operating the slide valve.

Figure 3:
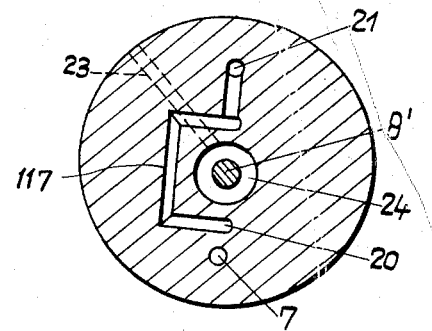
FIG. 3 is a cross-sectional view taken along the line III—III of FIG. 1 and showing the control passages and other means whereby the slide valve is operated.
Figure 4:
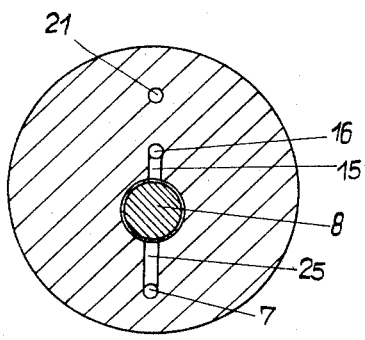
FIG. 4 is a cross-sectional view taken along the line IV—IV of FIG. 1 illustrating another portion of the control passages and its relationship with the piston.
Figure 5:
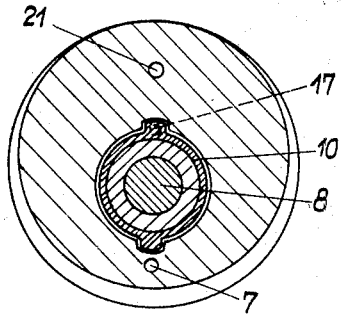
FIG. 5 is a cross-sectional view taken along the line V—V showing the slide-valve chamber surrounding the piston.
Figure 6:
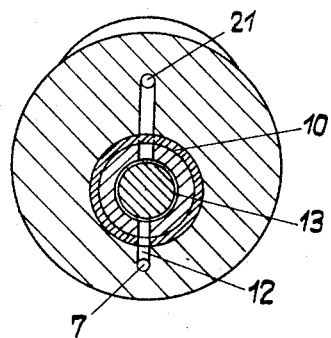
FIG. 6 is a cross-sectional view taken along the line VI—VI of FIG. 1 illustrating the radial passages co-operating with the slide valve.
Figure 7:
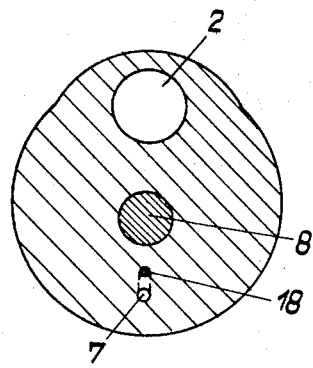
FIG. 7 is a cross-sectional view taken along the line VII—VII of FIG. 1 showing the low-pressure accumulator.

The low-pressure line 21 is provided with a generally radial branch 116 communicating with passage 117 (FIG. 3) and 20 (FIG. 1), the latter opening radially into the piston bore 103 at a location axially rearward from passage 25. Diametrically opposite the mouth of passage 20, a radial bore 19 (communicating with bore 16) opens into the cylinder bore 103. The body 8′ of the piston 8 is provided with a circumferential channel 14 selectively alignable with the bores 15, 25 and 19, 20 in the extreme forward and rearward positions of the piston to interconnect the bores of each diametrical pair with one another. To equalize the flow of fluid in the outlet bore 21, which can be connected to the pump 105 by a conduit diagrammatically represented at 118 or with the reservoir via this conduit, the low-pressure outlet means is provided with a low-pressure force-storing accumulator generally designated by the reference numeral 2. This accumulator can be of spherical or cylindrical configuration and includes a space 6 containing a compressible gas (e.g. air) and a flexible diaphragm 5 interposed between the required medium in line 21 and the compressible gas. Similarly, the high-pressure line 7 is provided with a high-pressure accumulator 1 whose gas space 4 is partitioned from the liquid medium by a flexible diaphragm 3, the high-pressure accumulator being connected to the high-pressure line 7 via the extension 104 of the bore.

OPERATION

I.—Rearward stroke

When the device has its piston 8 and its slide valve 10 in their positions illustrated in FIG. 1, the kinetic energy of the piston has been delivered to the tool 9 and the piston 8 is in its extreme left-hand or forward position. From the pump 105, the fluid medium, which can be air, but is generally a liquid, flows through the high-pressure line 7 into the passage 111 from which it enters the chamber 13 via passage 107 and the aperture 12 in slide valve 10. The larger surface $F_2$ of the piston 8 is thus under high pressure as is the smaller and oppositely effective surface $F_1$, which is constantly under the pressure of the source. Since surface $F_2$ has a larger area than surface $F_1$, the piston is acted upon differentially by the pressure of the hydraulic medium and, under the greater hydraulic force applied to surface $F_2$ is displaced toward the right during its rearward stroke. Since the quantity Q of the liquid supplied to the chamber 7 per unit time is essentially constant and the quantity $q$ required by chamber 13 in the left-hand position of piston 8 is relatively small or even negligible, excess fluid is stored in the accumulator 1 by compression of the air therein and deflection of the diaphragm 3.

As the piston 8 is accelerated to the right, however, the fluid requirements $q$ of chamber 13 increase rapidly until $q=Q$. Excess fluid now is fed to the accumulator 1 which, however, has received and stores the excess fluid from the earlier period. When the medium requirement $q$ exceeds the quantity Q of hydraulic fluid available from the pump 105, the fluid deficiency is provided by the accumulator 1 whose gas space 4 expands to drive out the stored liquid and force it into the high-pressure line 7. As a consequence, an equalization is effected between the available fluid quantity Q and the quantity $q$ of the medium liquid during the reciprocation of the piston 8.

Figure 9:
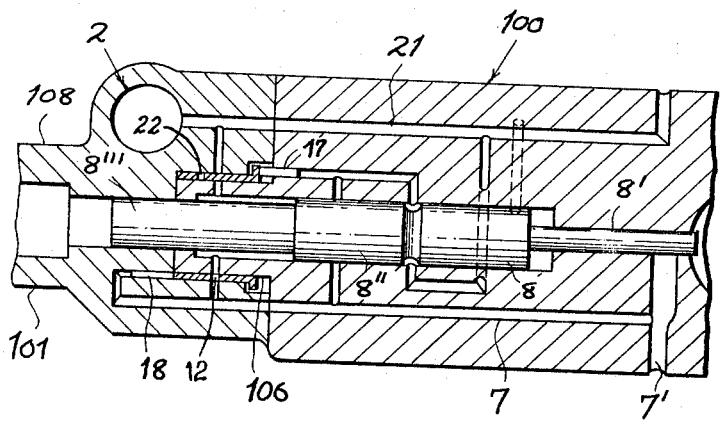
FIG. 9 is another fragmentary view similar to FIG. 1 showing still another arrangement of the moving parts of the device.

As seen in FIG. 9, surface $F_3$ of the piston 8 and the shoulder at the junction of pistons 8' and 8'' of the piston drives the air within chamber 24 out through passage 23 during the return stroke of the piston until the shoulder closes the mouth of this passage 23 and blocks further escape of air. Once the escape is terminated, the residual air is compressed by the surface $F_3$ and forms an air cushion for the piston preventing impact thereof against the housing and reducing a jarring effect of the rearward stroke. The pressure within chamber 24 builds up to a maximum of $P_{max}$ which bears the following relationship to the fluid pressure $P_s$ supplied at the high-pressure side to surfaces $F_2$ and $F_1$:

$$P_{max.} = P_s \frac{(F_2 - F_1)}{F_3}$$

wherein the pressures are given in identical units and $F_1$, $F_2$ and $F_3$ are in terms of surface areas $F_2$ being larger than $F_1$; this relationship is idealized. When $P_{max}$ is attained, further displacement of the piston to the right is terminated (FIG. 9).

II.—Forward stroke

Figure 8:
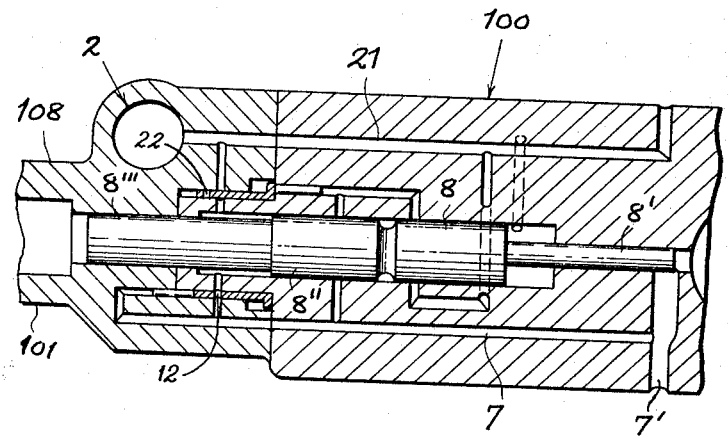
FIG. 8 is a fragmentary view similar to FIG. 1 but illustrating the arrangement with the annular slide valve in another extreme position and the piston in an intermediate position.

With the piston 8 in its extreme right-hand position (FIG. 9) the annular or circumferential groove 14 communicates between the passage 19 and the passage 20 to permit the flow of fluid from channel 16 through passages 19, 20, 117 and 116 (FIG. 3) to the low-pressure line 21. This reduction in the pressure within channel 16 reduces the pressure applied to the large piston surface $F_6$ of the slide-valve 10 while the smaller surface $F_5$ in channel 113 remains under the pressure of the high-pressure line 7. The slide-valve 10 is thus displaced to the right under the pressure applied to piston face $F_5$ until bore 22 of the slide-valve communicates between the passages 109 and 102 while bore 12 is displaced from registry with passages 107, 111. Hydraulic fluid in working compartment 13 is thus driven therefrom through passage 109, bore 22 and passage 112 into the low-pressure outlet line 21 concurrently, the gas in chamber 24 explodes against the piston 8 until passage 23 is unblocked while hydraulic pressure continues to be applied to surface $F_1$. The passage 8 is thus displaced to the left. When the piston was in its extreme right-hand position, and during the internal movement of the piston 8 to the left, the accumulator 1 was charged so that, as the piston accelerates toward its impact with the tool 9, insufficient supply of fluid by the pump 105 does not restrain the transfer of maximum kinetic energy since the deficiency of fluid is supplied by the accumulator 1. In FIG. 8, I show the beginning of the forward stroke.

When piston 8 is in its extreme left-hand position, after delivering its energy to the tool 9, the circumferential groove 4 communicates between the bores 15 and 25 while blocking passages 19 and 20. Thus hydraulic fluid at an elevated pressure was supplied to channel 16 and applied to surface $F_6$. Since this surface is larger than surface $F_5$, which is constantly under the elevated hydraulic pressure, the slide-valve 10 is differentially shifted to the left (from its position shown in FIG. 8 to that of FIG. 9) to recommence the cycle.

The fluid passing through low-pressure line 21 is returned to the pump so that the supply quantity Q is constantly drawn therefrom, however, as the speed of the piston 8 increases during its forward stroke, the quantity of fluid forced into the low-pressure line 21 increases so that the pressure in this line also increases owing to the fact that only the constant quantity Q is drawn from the line. The low-pressure accumulator takes up the excess fluid and thus limits the pressure developed in line 21. When the piston 8 operates at low speeds or during the reverse stroke of the piston, accumulator 2 continues to supply fluid to line 21 so that equalization of the fluid flow through this duct is effected.

The invention described and illustrated is believed to to admit of many modifications within the ability of persons skilled in the art, all such modifications being considered within the spirit and scope of the appended claims.

I claim:

1. An impact device for the generation of percussive force, comprising:
   a housing formed with an axially extending bore;
   an impact piston axially reciprocable within said bore between a rearward position wherein said piston is withdrawn from an impact-receiving element and a forward position wherein said piston transfers energy to said element, said piston defining in said bore at least one working chamber;
   high-pressure inlet means in said housing for supplying said bore with a fluid medium under an elevated pressure;
   low-pressure outlet means in said housing for leading fluid away from said chamber, said inlet and outlet means each being provided with a respective force-storing fluid-pressure accumulator;
   and an annular slide valve in said housing surrounding said piston and said chamber while being axially shiftable in said housing for alternately connecting said chamber with said inlet and outlet means to reciprocate said piston, said impact piston having a surface exposed to the inlet pressure of said medium unvalved by said slide valve and effective to shift said piston in a forward direction, one of said fluid-pressure accumulators communicating with said inlet means close to said surface.

2. An impact device for the generation of percussive force, comprising:
   a housing formed with an axially extending bore;
   a piston axially reciprocable within said bore between a rearward position wherein said piston is withdrawn from an impact-receiving element and a forward position wherein said piston transfers its kinetic energy to said element, said piston defining in said bore a first and a second axially spaced chamber, said piston having a relatively small surface area exposed to fluid within said first chamber and effective upon the fluid pressure in said first chamber exceeding the fluid pressure in said second chamber to urge said piston in the forward direction and a relatively large surface area exposed to fluid in said second chamber and effective upon the fluid pressure in said second chamber equalling the fluid pressure in said first chamber to differentially displace said piston in the rearward direction;
   high-pressure inlet means in said housing in continuous communication with said first chamber;
   low-pressure outlet means in said housing, said inlet and outlet means each including a respective force-storing fluid-pressure accumulator within said housing for storing fluid upon the supply thereof to the respective means exceeding the flow of fluid away therefrom;
   an axially shiftable annular slide valve in said housing surrounding said piston and said second chamber, said slide valve having a pair of axially offset bores respectively connecting said inlet means with said second chamber and said second chamber with said outlet means respective extreme axial positions of said slide valve; and
   differential piston means connected with said slide valve for reciprocating same to alternately connect said scond chamber to said inlet means and said inlet means for reciprocating said piston rearwardly and forwardly, respectively.

3. An impact device for the generation of percussive force, comprising:
a housing formed with an axially extending bore;
a piston axially reciprocable within said bore between a rearward position wherein said piston is withdrawn from an impact-receiving element and a forward position wheerin said piston transfers its kinetic energy to said element, said piston defining in said bore a first and a second axially spaced chamber, said piston having a relatively small surface area exposed to fluid within said first chamber and effective upon the fluid pressure in said first chamber exceeding the fluid pressure in said second chamber to urge said piston in the forward direction and a relatively large surface area exposed to fluid in said second chamber and effective upon the fluid pressure in said second chamber equalling the fluid pressure in said first chamber to differentially displace said piston in the rearward direction;
high-pressure inlet means in said housing in continuous communication with said first chamber;
low-pressure outlet means in said housing, said inlet and outlet means each including a respective force-storing fluid-pressure accumulator within said housing for storing fluid upon the supply thereof to the respective means exceeding the flow of fluid away therefrom;
an axially shiftable annular slide valve in said housing surrounding said piston and said second chamber, said slide valve having a pair of axially offset bores respectively connecting said inlet means with said second chamber and said second chamber with said outlet means respective extreme axial positions of said slide valve; and
differential piston means connected with said slide valve for reciprocating same to alternately connect said second chamber to said inlet means and said outlet means for reciprocating said piston rearwardly and forwardly, respectively, said housing being provided with a pair of generally radial diametrically opposite passages communicating respectively with said inlet and outlet means, said axially offset bores of said slide valve registering respectively with said passages in said extreme axial positions of said slide valve for connecting said passages with said second chamber.

4. An impact device for the generation of percussive force, comprising:
a housing formed with an axially extending bore;
a piston axially reciprocable within said bore between a rearward position wherein said piston is withdrawn from an impact-receiving element and a forward position wherein said piston transfers its kinetic energy to said element, said piston defining in said bore a first and a second axially spaced chamber, said piston having a relatively small surface area exposed to fluid within said first chamber and effective upon the fluid pressure in said first chamber exceeding the fluid pressure in said second chamber to urge said piston in the forward direction to a relatively large surface area exposed to fluid in said second chamber and effective upon the fluid pressure in said second chamber equalling the fluid pressure in said first chamber to differentially displace said piston in the rearward direction;
high-pressure inlet means in said housing in continuous communication with said first chamber;
low-pressure outlet means in said housing, said inlet and outlet means each including a respective force-storing fluid-pressure accumulator within said housing for storing fluid upon the supply thereof to the respective means exceeding the flow of fluid away therefrom;
an axially shiftable slide valve in said housing surrounding said piston and said second chamber, said slide valve having a pair of axially offset bores respectively connecting said inlet means with said second chamber and said second chamber with said outlet means respective axial positions of said slide valve; and
differential piston means connected with said slide valve for reciprocating same to alternately connect said second chamber to said inlet means and said outlet means for reciprocating said piston rearwardly and forwardly, respectively, said differential piston means including a pair of axially extending pins affixed to said slide valve at opposite axial ends thereof, said pins being of different diameters, said housing being formed with a pair of generally axial channels respectively receiving said pins slidably therein, the one of said axial channels receiving the smaller-diameter pin continuously communicating with said inlet means, the other of said channels being selectively connectable with said inlet means and said outlet means upon reciprocation of said piston.

5. An impact device for the generation of percussion force, comprising:
a housing formed with an axially extending bore;
a piston axially reciprocable within said bore between a rearward position wherein said piston is withdrawn from an impact-receiving element and a forward position wherein said piston transfers its kinetic energy to said element, said piston defining in said bore a first and a second axially spaced chamber, said piston having a relatively small surface area exposed to fluid within said first chamber and effective upon the fluid pressure in said first chamber exceeding the fluid pressure in said second chamber to urge said piston in the forward direction and a relatively large surface area exposed to fluid in said second chamber and effective upon the fluid pressure in said second chamber equalling the fluid pressure in said first chamber to differentially displace said piston in the rearward direction;
high-pressure inlet means in said housing in continuous communication with said first chamber;
low-pressure outlet means in said housing, said inlet and outlet means each including a respective force-storing fluid-pressure accumulator within said housing for storing fluid upon the supply thereof to the respective means exceeding the flow of fluid away therefrom;
an axially shiftable annular slide valve in said housing surrounding said piston and said second chamber, said slide valve having a pair of axially offset bores respectively connecting said inlet means with said second chamber and said second chamber with said outlet means in respective extreme axial positions of said slide valve; and
differential piston means connected with said slide valve for reciprocating same to alternately connect said second chamber to said inlet means and said outlet means for reciprocating said piston rearwardly and forwardly, respectively, said differential piston means including a pair of axially extending pins affixed to said slide valve at opposite axial ends thereof, said pins being of different diameters, said housing being formed with a pair of generally axial channels respectively receiving said pins slidably therein, the one of said axial channels receiving the smaller diameter pin continuously communicating with said inlet means, the other of said channels being selectively connectable with said inlet means and said outlet means upon reciprocation of said piston, said housing being provided with a pair of generally radial diametrically opposite passages communicating respectively with said inlet and outlet means, said axially offset bores of said slide valve registering respectively with said passages in said extreme axial positions of said slide valve for connecting said passages with said second chamber.

6. An impact device for the generation of percussive force, comprising:
a housing formed with an axially extending bore;
a piston axially reciprocable within said bore between a rearward position wherein said piston is withdrawn from an impact-receiving element and a forward position wherein said piston transfers its kinetic energy to said element, said piston defining in said bore a first and a second axially spaced chamber, said piston having a relatively small surface area exposed to fluid within said first chamber and effective upon the fluid pressure in said first chamber exceeding the fluid pressure in said second chamber to urge said piston in the forward direction and a relatively large surface area exposed to fluid in said second chamber and effective upon the fluid pressure in said second chamber equalling the fluid pressure in said first chamber to differentially displace said piston in the rearward direction;

high-pressure inlet means in said housing in continuous communication with said first chamber;

low-pressure outlet means in said housing, said inlet and outlet means each including a respective force-storing fluid-pressure accumulator within said housing for storing fluid upon the supply thereof to the respective means exceeding the flow of fluid away therefrom;

an axially shiftable annular slide valve in said housing surrounding said piston and said second chamber, said slide valve having a pair of axially offset bores respectively connecting said inlet means with said second chamber and said second chamber with said outlet means in respective extreme axial positions of said slide valve;

differential piston means connected with said slide valve for reciprocating same to alternately connect said second chamber to said inlet means and said outlet means for reciprocating said piston rearwardly and forwardly, respectively;

and means forming a gas cushion upon displacement of said piston in said rearward direction into an extreme position for resiliently limiting displacement of said piston in said rearward direction.

7. An impact device for the generation of percussive force, comprising:

a housing formed with an axially extending bore;

a piston axially reciprocable within said bore between a rearward position wherein said piston is withdrawn from an impact-receiving element and a forward position wherein said piston transfers its kinetic energy to said element, said piston defining in said bore a first and a second axially spaced chamber, said piston having a relatively small surface area exposed to fluid within said first chamber and effective upon the fluid pressure in said first chamber exceeding the fluid pressure in said second chamber to urge said piston in the forward direction and a relatively large surface area exposed to fluid in said second chamber and effective upon the fluid pressure in said second chamber equalling the fluid pressure in said first chamber to differentially displace said piston in the rearward direction;

high-pressure inlet means in said housing in continuous communication with said first chamber;

low-pressure outlet means in said housing, said inlet and outlet means each including a respective force-storing fluid-pressure accumulator within said housing for storing fluid upon the supply thereof to the respective means exceeding the flow of fluid away therefrom;

an axially shiftable annular slide valve in said housing surrounding said piston and said second chamber, said slide valve having a pair of axially offset bores respectively connecting said inlet means with said second chamber and said second chamber with said outlet means in respective extreme axial positions of said slide valve;

differential piston means connected with said slide valve for reciprocating same to alternately connect said second chamber to said inlet means and said outlet means for reciprocating said piston rearwardly and forwardly, respectively;

and means forming a gas cushion upon displacement of said piston in said rearward direction into an extreme position for resiliently limiting displacement of said piston in said rearward direction, the last mentioned means including a compartment formed at a rearward portion of said axially extending bore and a face of said piston for compressing a gas within said compartment, said housing being provided with a further passage normally communicating between said compartment and a source of said gas in a forward position of said piston but blocked thereby upon displacement of said piston rearwardly to confine the gas within said compartment.

8. An impact device for the generation of percussive force, comprising:

a housing formed with an axially extending bore;

a piston axially reciprocable within said bore between a rearward position wherein said piston is withdrawn from an impact-receiving element and a forward position wherein said piston transfers its kinetic energy to said element, said piston defining in said bore a first and a second axially spaced chamber, said piston having a relatively small surface area exposed to fluid within said first chamber and effective upon the fluid pressure in said first chamber exceeding the fluid pressure in said second chamber to urge said piston in the forward direction and a relatively large surface area exposed to fluid in said second chamber and effective upon the fluid pressure in said second chamber equalling the fluid pressure in said first chamber to differentially displace said piston in the rearward direction;

high-pressure inlet means in said housing in continuous communication with said first chamber;

low-pressure outlet means in said housing, said inlet and outlet means each including a respective force-storing fluid-pressure accumulator within said housing for storing fluid upon the supply thereof to the respective means exceeding the flow of fluid away therefrom;

an axially shiftable annular slide valve in said housing surrounding said piston and said second chamber, said slide valve having a pair of axially offset bores respectively connecting said inlet means with said second chamber and said second chamber with said outlet means in respective extreme axial positions of said slide valve;

differential piston means connected with said slide valve for reciprocating same to alternately connect said second chamber to said inlet means and said outlet means for reciprocating said piston rearwardly and forwardly, said differential piston means including a pair of axially extending pins affixed to said slide valve at opposite axial ends thereof, said pins being of different diameters, said housing being formed with a pair of generally axial channels respectively receiving said pins slidably therein the one of said axial channels receiving the smaller diameter pin continuously communicating with said inlet means, the other of said channels being selectively connectable with said inlet means and said outlet means upon reciprocation of said piston;

and means forming a gas cushion upon displacement of said piston in said rearward direction into an extreme position for resiliently limiting displacement of said piston in said rearward direction, the last-mentioned means including a compartment formed at a rearward portion of said axially extending bore and a face of said piston for compressing a gas within said compartment, said housing being provided with a further passage normally communicating between said compartment and a source of said gas in a forward position of said piston but blocked thereby upon displacement of said piston rearwardly to confine the gas within said compartment.

9. An impact device for the generation of percussive force comprising:
- a housing formed with an axially extending bore;
- a piston axially reciprocable within said bore between a rearward position wherein said piston is withdrawn from an impact-receiving element and a forward position wherein said piston transfers its kinetic energy to said element, said piston defining in said bore a first and a second axially spaced chamber, said piston having a relatively small surface area exposed to fluid within said first chamber and effective upon the fluid pressure in said first chamber exceeding the fluid pressure in said second chamber to urge said piston in the forward direction and a relatively large surface area exposed to fluid in said second chamber and effective upon the fluid pressure in said second chamber equalling the fluid pressure in said first chamber to differentially displace said piston in the rearward direction;
- high-pressure inlet means in said housing in continuous communication with said first chamber;
- low-pressure outlet means in said housing, said inlet and outlet means each including a respective force-storing fluid-pressure accumulator within said housing for storing fluid upon the supply thereof to the respective means exceeding the flow of fluid away therefrom;
- an axially shiftable annular slide valve in said housing surrounding said piston and said second chamber, said slide valve having a pair of axially offset bores respectively connecting said inlet means with said second chamber and said chamber with said outlet means in respective extreme axial positions of said slide valve;
- differential piston means connected with said slide valve for reciprocating same to alternately connect said second chamber to said inlet means and said outlet means for reciprocating said piston rearwardly and forwardly, respectively; said differential piston means including a pair of axially extending pins affixed to said slide valve at opposite axial ends thereof, said pins being of different diameters, said housing being formed with a pair of generally axial channels respectively receiving said pins slidably therein, the one of said axial channels receiving the smaller diameter pin continuously communicating with said inlet means, the other of said channels being selectively connectable with said inlet means and said outlet means upon reciprocation of said piston, said housing being provided with a pair of generally radial diametrically opposite passages communicating respectively with said inlet and outlet means, said axially offset bores of said slide valve registering respectively with said passages in said extreme axial positions of said slide valve for connecting said passages with said second chamber;
- and means forming a gas cushion upon displacement of said piston in said rearward direction into an extreme position for resiliently limiting displacement of said piston in said rearward direction; the last-mentioned means including a compartment formed at a rearward portion of said axially extending bore and a face of said piston for compressing a gas within said compartment, said housing being provided with a further passage normally communicating between said compartment and a source of said gas in a forward position of said piston but blocked thereby upon displacement of said piston rearwardly to confine the gas within said compartment.

References Cited
UNITED STATES PATENTS

| | | | |
|---|---|---|---|
| 1,044,263 | 11/1912 | Schumacher | 173—137 |
| 1,107,550 | 8/1914 | Robertson | 173—137 |
| 1,739,338 | 12/1929 | Wadsworth | 173—127 |
| 1,837,735 | 12/1931 | Terry | 173—134 |
| 3,204,534 | 9/1965 | Spannhake | 173—127 |

FRED C. MATTERN, JR., *Primary Examiner.*

L. P. KESSLER, *Assistant Examiner.*